United States Patent
Reitenbaugh, Sr.

(10) Patent No.: US 8,051,599 B2
(45) Date of Patent: Nov. 8, 2011

(54) PERCUSSIVE RODENT TRAP

(75) Inventor: Vernon J. Reitenbaugh, Sr., Oregon City, OR (US)

(73) Assignee: Triple-T Machining Specialties, Inc., Oregon City, OR (US)

( * ) Notice: Subject to any disclaimer, the term of this patent is extended or adjusted under 35 U.S.C. 154(b) by 236 days.

(21) Appl. No.: 11/999,685

(22) Filed: Dec. 5, 2007

(65) Prior Publication Data

US 2009/0145018 A1    Jun. 11, 2009

(51) Int. Cl.
*A01M 27/00* (2006.01)

(52) U.S. Cl. ......... 43/84; 42/70.01; 42/70.04; 42/70.06; 42/70.08; 89/1.14; 227/9

(58) Field of Classification Search .......... 43/84; 227/9, 227/10; 42/70.01, 70.04, 70.05, 70.06, 70.08; 89/1.14
See application file for complete search history.

(56) References Cited

U.S. PATENT DOCUMENTS

| | | | | |
|---|---|---|---|---|
| 1,365,870 A * | 1/1921 | Temple | | 227/9 |
| 1,464,861 A * | 8/1923 | Armstrong | | 43/84 |
| 1,734,876 A * | 11/1929 | Pfeifer | | 43/84 |
| 1,884,721 A * | 10/1932 | Karr | | 43/84 |
| 2,001,405 A * | 5/1935 | Abbott | | 43/84 |
| 2,213,435 A * | 9/1940 | Temple, Jr. | | 227/9 |
| 2,248,157 A * | 7/1941 | Barnes | | 43/84 |
| 2,301,764 A * | 11/1942 | Wainwright | | 43/84 |
| 2,395,354 A * | 2/1946 | Temple | | 227/9 |
| 2,479,431 A * | 8/1949 | Temple | | 227/9 |
| 2,499,227 A * | 2/1950 | Miles | | 89/1.14 |
| 2,512,252 A * | 6/1950 | Lehn | | 43/84 |
| 2,515,447 A * | 7/1950 | Graybill | | 43/84 |
| 2,575,515 A * | 11/1951 | Graybill | | 43/84 |
| 2,622,243 A * | 12/1952 | Temple et al. | | 227/9 |
| 2,624,148 A * | 1/1953 | Graybill | | 43/84 |
| 2,665,421 A * | 1/1954 | Temple | | 227/9 |
| 2,716,303 A * | 8/1955 | Hudson et al. | | 43/84 |
| 2,766,451 A * | 10/1956 | Gannon | | 227/9 |
| 2,804,620 A * | 9/1957 | Gannon | | 227/9 |
| 2,819,674 A * | 1/1958 | Prodanovich | | 43/84 |
| 2,930,042 A * | 3/1960 | Temple et al. | | 227/10 |
| 3,065,560 A * | 11/1962 | Bumiller | | 227/9 |
| 3,688,964 A * | 9/1972 | De Caro | | 227/10 |
| 3,902,238 A * | 9/1975 | Monson | | 227/10 |
| 3,923,225 A * | 12/1975 | Maier et al. | | 227/9 |
| 4,060,188 A * | 11/1977 | Monson | | 227/9 |
| 4,159,070 A * | 6/1979 | Monson | | 227/10 |
| 4,479,599 A * | 10/1984 | Conrad | | 227/9 |
| 4,512,102 A * | 4/1985 | Long | | 43/84 |
| 4,539,774 A * | 9/1985 | Hamilton | | 43/84 |

(Continued)

FOREIGN PATENT DOCUMENTS

EP       231704 A1 *  8/1987

(Continued)

*Primary Examiner* — Darren W Ark

(74) *Attorney, Agent, or Firm* — Schwabe, Williamson & Wyatt, P.C.

(57) ABSTRACT

A percussive rodent trap has an activation mechanism and a hammer for striking a percussive device when the activation mechanism is activated. A first safety moves the hammer mechanism to a cocked position and prevents it from being released from this cocked position. A second safety can be engaged after the first safety is engaged to prevent the activation mechanism from being activated when the first safety is removed. The second safety is easily removed after the trap is put in place without inadvertently activating the activation mechanism.

10 Claims, 5 Drawing Sheets

U.S. PATENT DOCUMENTS

| | | | | |
|---|---|---|---|---|
| 4,622,773 | A | * | 11/1986 | Calagui .................................. 43/84 |
| 4,640,043 | A | * | 2/1987 | Sigler .................................. 43/84 |
| 4,733,493 | A | * | 3/1988 | Edstrom .................................. 43/84 |
| 4,830,252 | A | * | 5/1989 | Gottlieb et al. .................. 227/10 |
| 4,926,574 | A | * | 5/1990 | Rieger .......................... 42/70.04 |
| 5,038,665 | A | * | 8/1991 | Aske et al. ...................... 227/10 |
| 5,149,898 | A | * | 9/1992 | Chesnut et al. ............. 42/70.04 |
| 5,157,209 | A | * | 10/1992 | Dunn .......................... 42/70.08 |
| 5,272,957 | A | * | 12/1993 | Chesnut et al. ................. 89/195 |
| 6,266,909 | B1 | * | 7/2001 | Fuchs et al. .................. 42/75.01 |
| 6,364,190 | B1 | * | 4/2002 | Tor .................................. 227/10 |
| 6,543,665 | B1 | * | 4/2003 | Farrell et al. .................... 227/10 |
| 6,718,680 | B2 | * | 4/2004 | Roca et al. ................... 42/70.08 |
| 6,802,152 | B2 | * | 10/2004 | Hagen et al. ...................... 43/84 |
| 2007/0119094 | A1 | * | 5/2007 | Ouzts .................................. 43/84 |
| 2009/0151587 | A1 | * | 6/2009 | Brennan et al. ............... 102/301 |

FOREIGN PATENT DOCUMENTS

| | | | |
|---|---|---|---|
| EP | 780051 | A1 * | 6/1997 |
| EP | 1321038 | A1 * | 6/2003 |
| FR | 2754675 | A1 * | 4/1998 |
| WO | WO00/11945 | A1 * | 3/2000 |
| WO | WO 2005034623 | A1 * | 4/2005 |

* cited by examiner

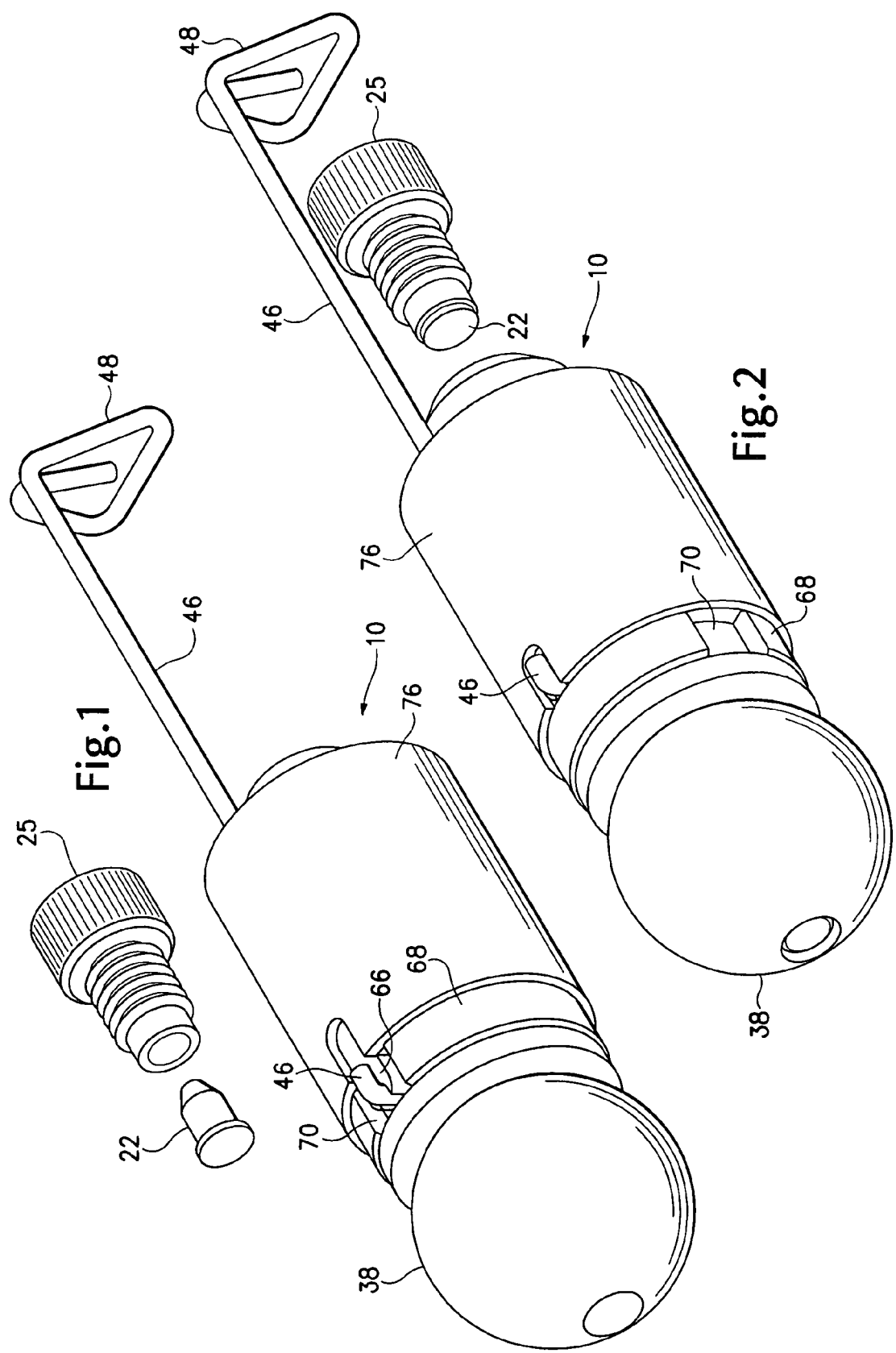

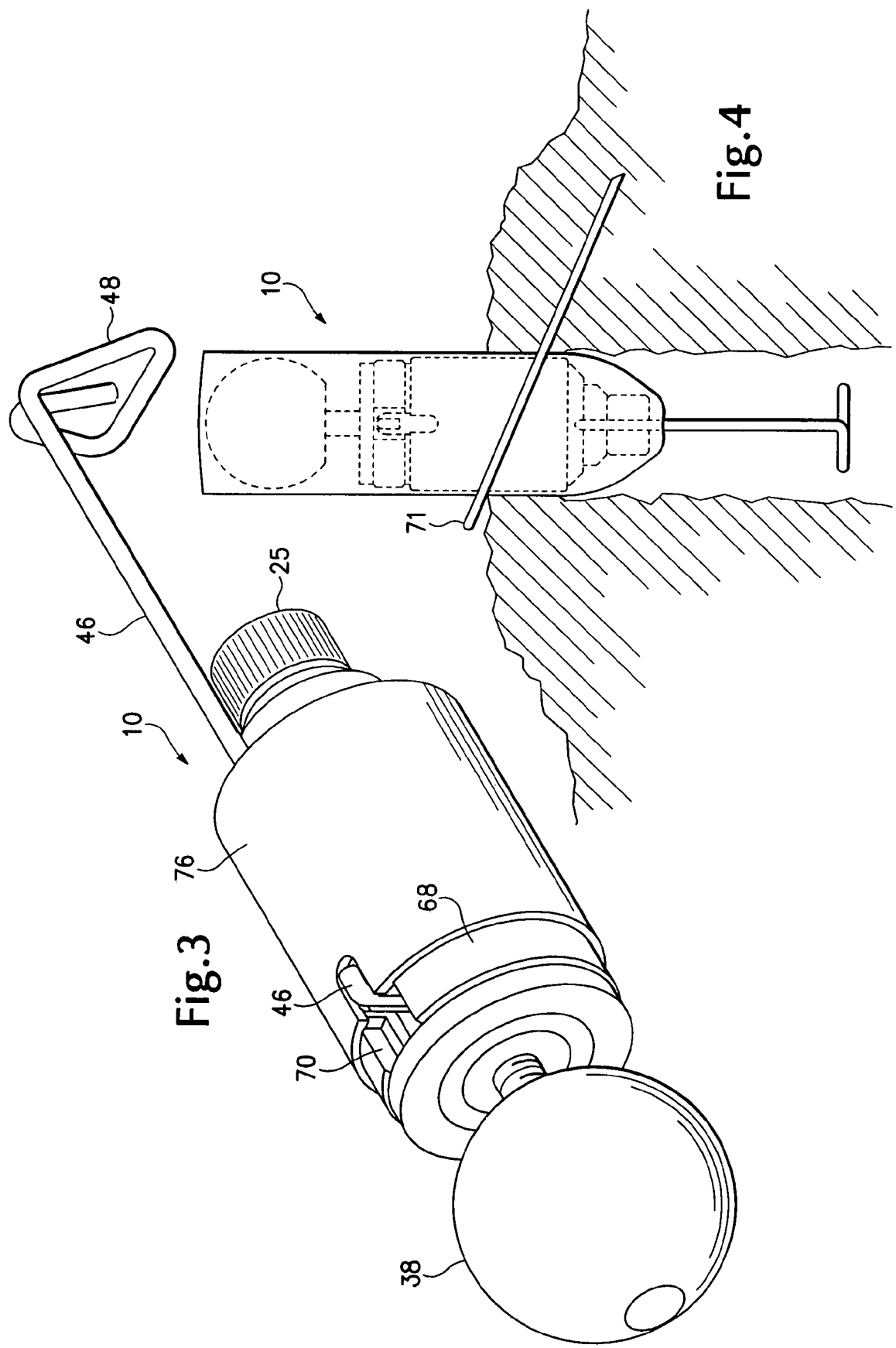

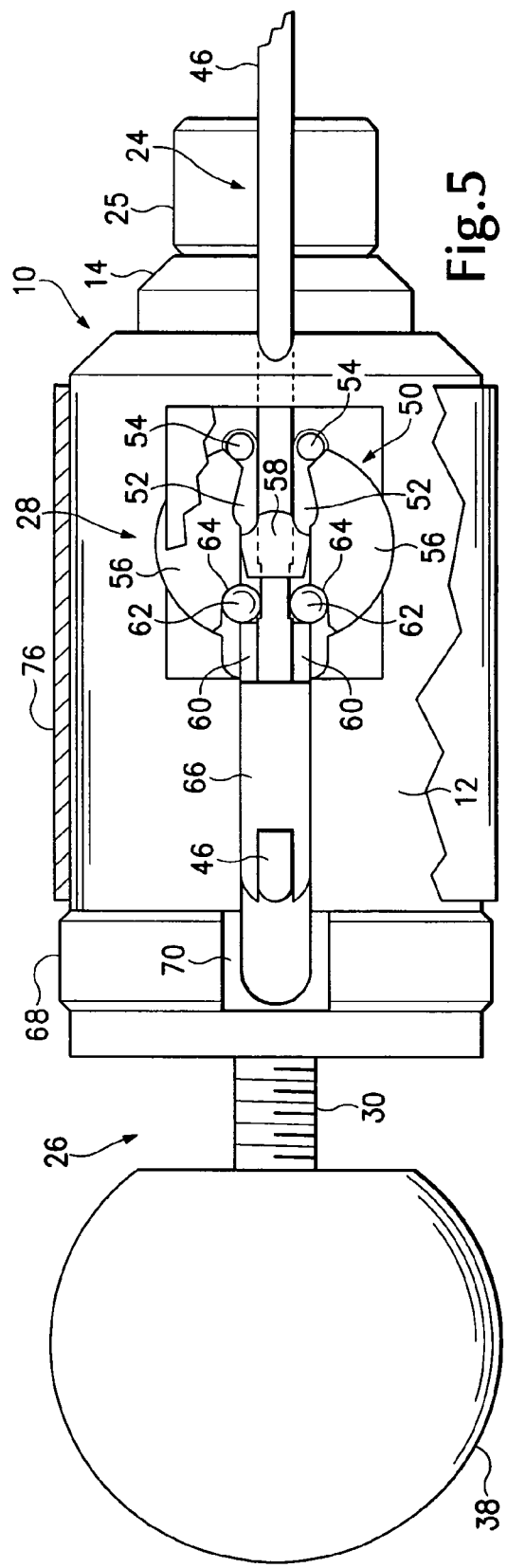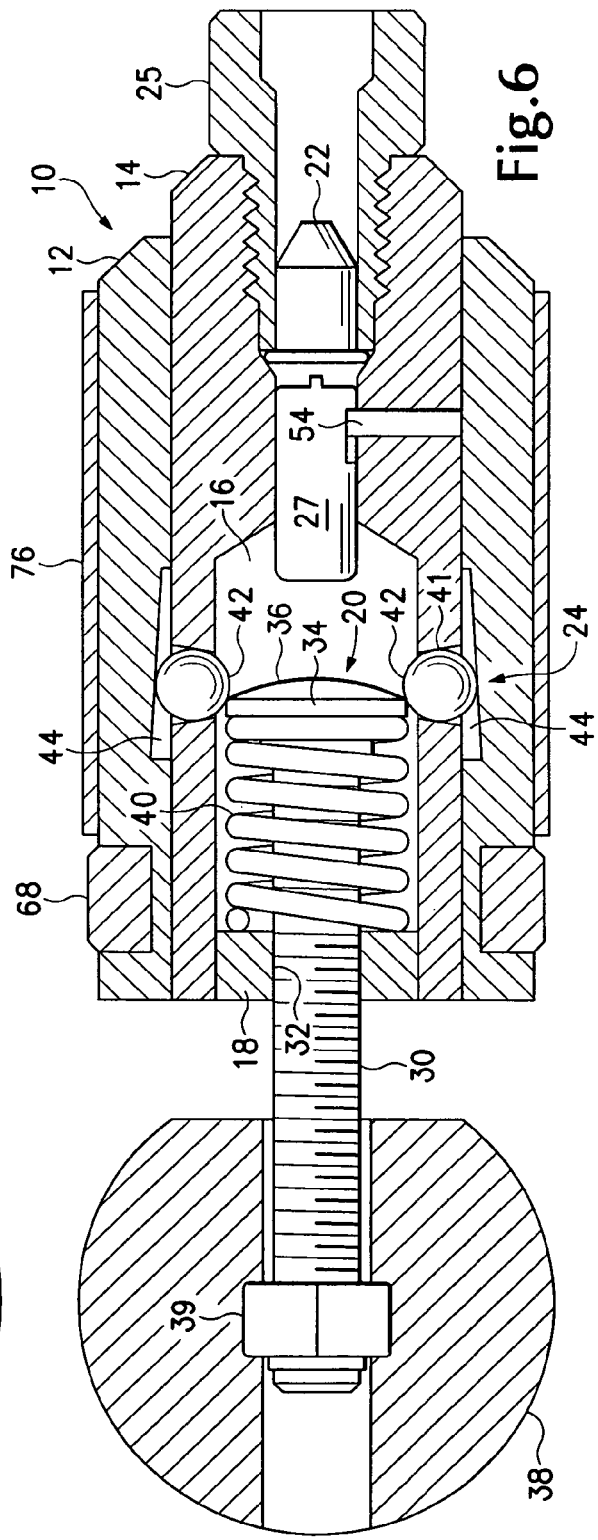

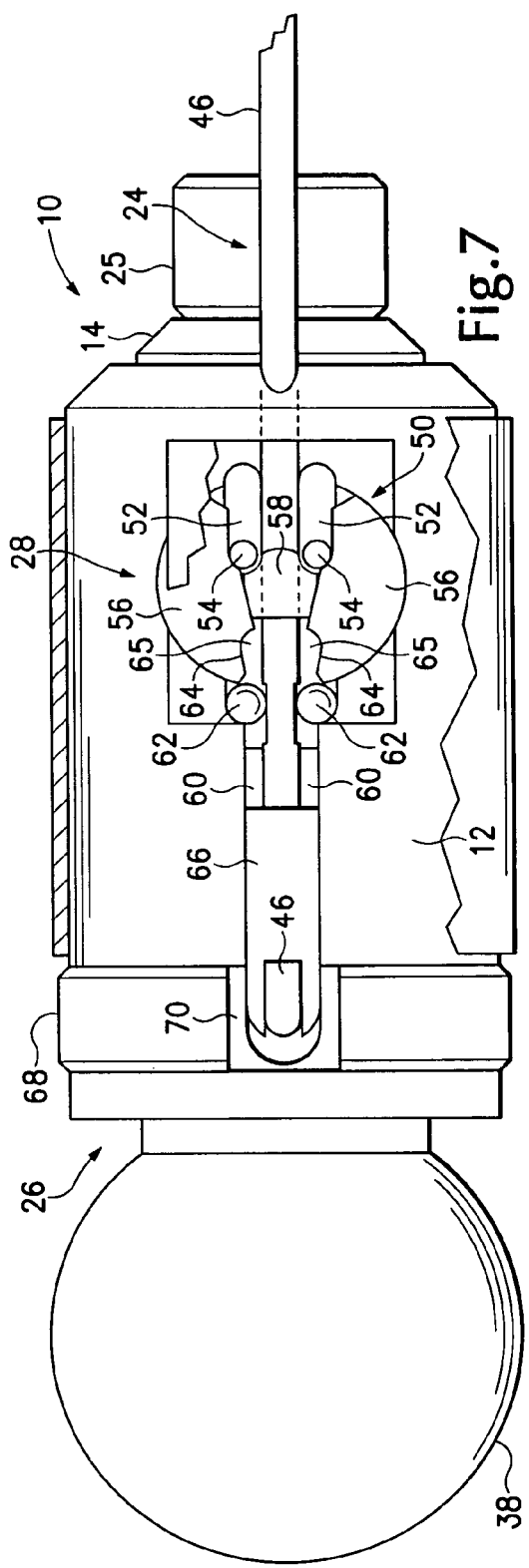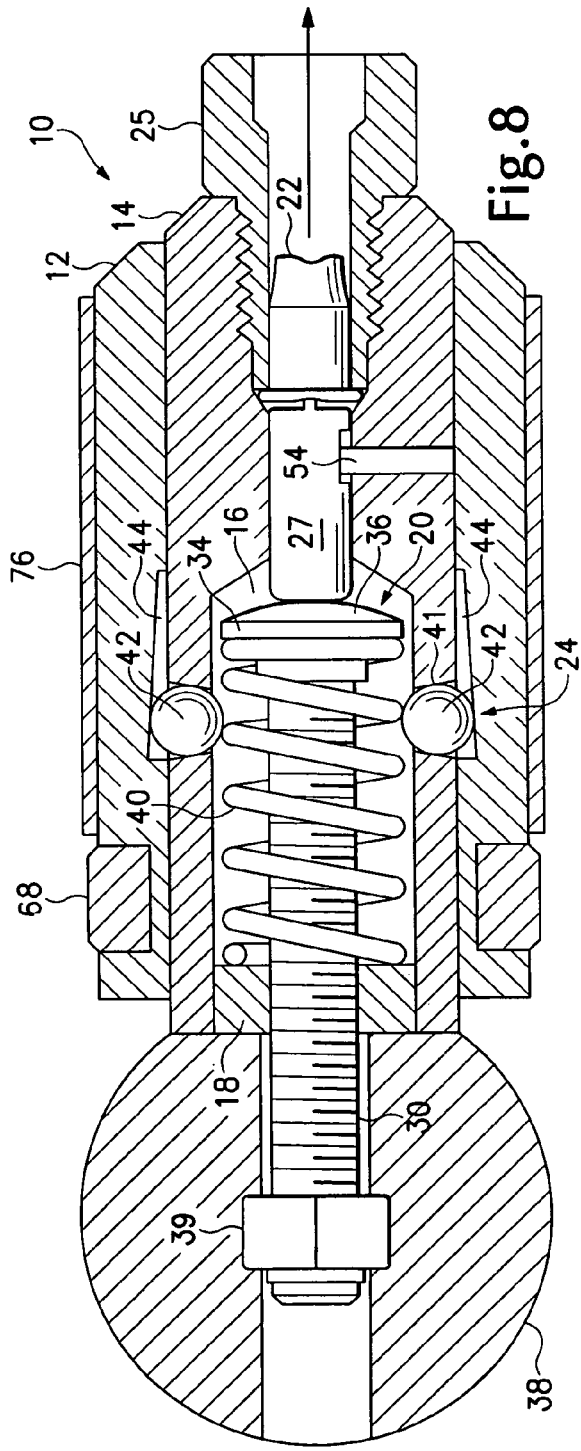

PERCUSSIVE RODENT TRAP

BACKGROUND OF THE INVENTION

Moles, gophers and other burrowing rodents cause extensive damage to lawns, athletic fields, golf courses, and agricultural land by creating raised mounds. Over the years numerous devices have been developed to trap rodents. Because burrowing rodents are sensitive to shock waves, one of the most effective ways of exterminating them is by using traps in which a percussive device is fired when the trap is triggered.

However, the person setting a percussive rodent trap can easily be injured if the trap is triggered while it is being installed in the rodent's run. To overcome this, complex trigger mechanisms have been used in the prior art percussive traps. This complexity increases the cost and, in many cases, reduces the effectiveness of the trap.

BRIEF SUMMARY OF THE INVENTION

The subject invention provides a percussive rodent trap having an activation mechanism and a hammer mechanism for striking a percussive device located in the trap when the activation mechanism is activated. A first safety allows the hammer mechanism to be placed in a cocked position and prevents the hammer mechanism from being released. A second safety prevents the activation mechanism from being activated after the first safety has been removed. The second safety is configured to be easily removed after the trap has been put in place, without inadvertently activating the activation mechanism.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIGS. 1, 2 and 3 are perspective views of a rodent trap embodying the subject invention showing the percussive device being placed in the trap.

FIG. 4 is a side elevation view, showing internal parts in phantom line, of the rodent trap of FIG. 1 installed.

FIG. 5 is a side elevation view of the trap, partially broken away to show hidden detail, in its ready-to-fire position.

FIG. 6 is a cross-sectional view of the trap as shown in FIG. 5.

FIG. 7 is a side elevation view of the trap, partially broken away to show hidden detail, after it has been fired.

FIG. 8 is a cross-section view of the trap as shown in FIG. 7.

DETAILED DESCRIPTION OF PREFERRED EMBODIMENT

Figure 9:
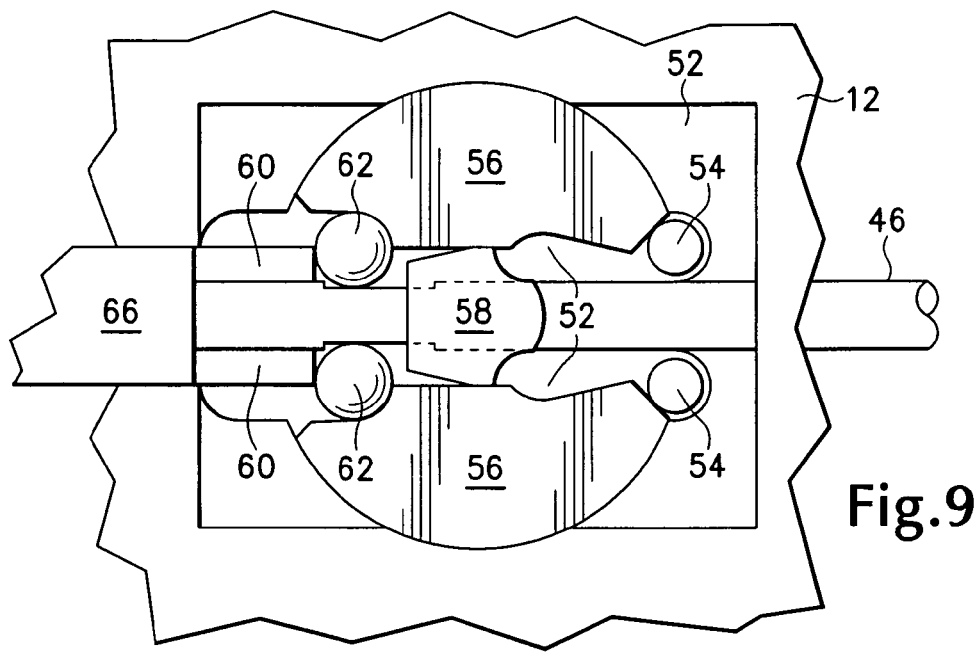
FIGS. 9, 10 and 11 are detailed views showing a second safety which is an element of the trap.
Figure 10:
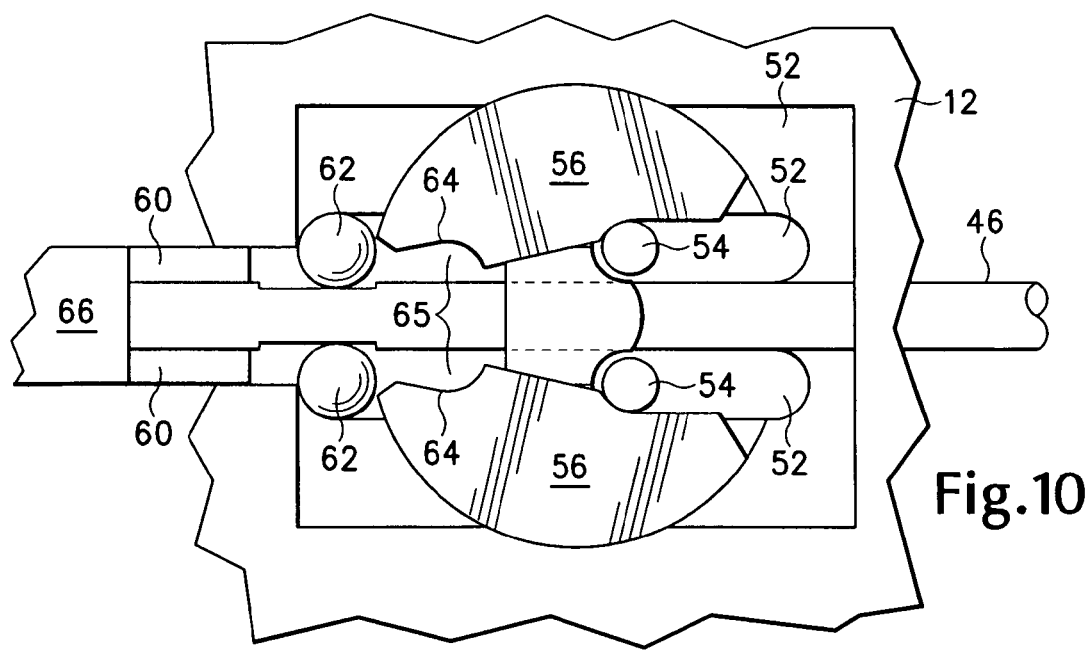

Referring now to FIGS. 6 and 8 of the drawings, a rodent trap 10 includes an annular cylindrical case 12. Slidably located within the case is a cylindrical slider 14. The slider 14 has a cavity 16 formed in it which is enclosed at one end by a cap 18 and is open at the other end. The portion of the cavity at the closed end has a larger diameter than the portion at the open end. A hammer mechanism 20 located in the larger diameter portion of the cavity 16 is moveable between a cocked position and a release position, where it is in contact with a firing pin 27 which in turn is in contact with a percussive device 22. When released, an activation mechanism 24, FIGS. 5-8, releases the hammer mechanism from its cocked position and allows it to move to its release position.

The percussive device 22, which preferably is a round used in a concrete nail gun, is placed in a round holder 25 which has a threaded barrel that fits into threads located at the end of the smaller diameter portion of the cavity 16. This allows the percussive device 22 to be inserted in the trap just before the trap is placed in the rodent's run. The firing pin 27, which slidably fits in the smaller diameter portion of the cavity 16 inwardly of the percussive device, projects into the larger diameter portion of the cavity where it will be impacted by the hammer mechanism 20 when it is released. A first safety 26, FIGS. 5 and 7, allows the hammer mechanism 20 to be moved to its cocked position and simultaneously prevents the hammer mechanism from being released. A second safety 28 prevents the activation mechanism 24 from being activated after the first safety is removed. The second safety 28 is easily removed after the rodent trap has been placed in a run without inadvertently activating the activation mechanism 24.

The hammer mechanism 20, FIGS. 6 and 8, includes a rod 30 which extends through a central opening 32 in the cap 18. The end of the rod which extends through the opening 32 is threaded and a cylindrical retainer 34 is located at the other end of the rod. The retainer has a spherical head 36. A knob 38 has a nut 39 embedded in it which is threaded onto the end of the rod which extends out of the cavity. A compression spring 40, which fits over the rod, extends between the cap 18 and the retainer 34. Both the retainer and the spring have a diameter which is slightly less than the diameter of the larger diameter portion of the cavity 16. The knob 38 and rod 30 provide the first safety 26 and by tightening the knob 38 on the rod 30 the hammer mechanism 20 is moved from its release position, FIG. 8, to its cocked position, FIG. 6, and the spring 40 is compressed between the retainer 34 and the cap 18. In addition to moving the hammer mechanism to its cocked position, when the knob 38 is tightened on the rod 30 it prevents the hammer mechanism from being released.

The activation mechanism 24, FIGS. 6 and 8, includes a plurality of large balls 42 which loosely fit in openings 41 located circumferentially in the slider 14. The large balls 42 have a diameter which is larger than the thickness of the slider 14. The large balls project slightly into the larger diameter portion of the cavity 16, but are prevented from moving further into the cavity by the spring 40 and retainer 34. A notch 44 is located on the inner wall of the case 12 adjacent each large ball. The notches 44 allow the large balls to extend slightly into the case 12. The notches are progressively deeper moving towards the closed end of the cavity.

The notches and large balls are sized such that when the spring is not compressed and the hammer mechanism is in its relaxed position the spring 40 keeps the large balls 42 in the deepest end of their respective notches 44, FIG. 8, and they prevent the slider 14 from moving relative to the case 12. However, when the knob 38 is tightened on the rod 30 and the spring 40 is completely compressed, the large balls are aligned with the spherical head 36 on the retainer 34 and can drop further into the cavity 16, FIG. 6. In this configuration the large balls do not extend completely into their respective notches 44, and the slider 14 is free to move slightly relative to case 12.

The second safety 28 includes a lock 50, FIGS. 5 and 7, which when engaged prevents the slider 14 from moving relative to the case 12 toward the left in the figures. Referring now also to FIGS. 5 and 7, the activation mechanism 24 includes a trigger rod 46 which is slidably mounted in the case 12 for movement between a set position, FIG. 5, and a release position, FIG. 7. The trigger rod 46 extends out of the case 12 and is bent at its outer end to form a pad 48, FIGS. 1 and 2. The lock mechanism 50 includes an opening 52 in the case 12. A pair of pins 54 extend out of the slider 14 into the opening 52. A pair of cams 56 located in the opening 52 rotate about a pivot 58 between a first position, FIG. 5, where the cams 56 engage the pins 54 and prevent the slider 14 from moving toward the left in the figures, and a second position, FIG. 7, where the cams 56 do not engage the pins 54 and the slider 14 is free to move towards the left in the figures. The trigger rod 46 runs between the cams 56 through an opening in the pivot 58. A trigger guide 66 which is attached to the trigger rod 46, includes a pair of fingers 60 which engage a pair of small balls 62. The trigger rod 46 wraps around the end of the trigger guide 66 and extends out of the case. When the slider 14 is moved away from the closed end of the cavity and the cams 56 are in their first position, FIG. 5 pulling the trigger rod 46 to its set position causes the finger 60 to push the small balls 62 into sockets 64 formed in the cams 56 and prevents the cams from moving to their second position. When the trigger rod 46 is in its set position a ring 68, which is rotatably mounted in the case 12, can be rotated to a closed position where it engages the trigger guide and prevents the trigger rod 46 from being moved to its release position. This engages the second safety 28. The knob 38 is then unscrewed on the shaft 30 and the second safety 28 prevents the activation mechanism 24 from being activated. The trap can then be placed in a run and the second safety can be released by rotating the ring 68 until an opening 70 in the ring is aligned with the trigger guide 66 on the activation rod 46. If it is desired to move the trap the ring 68 can be rotated to its closed position to reset the second safety before the trap is removed from its original position.

In order to prevent dirt from entering the opening 52 a thin cover 76 fits over the case 12.

Referring to FIG. 4, the preferred way of placing the trap is to place it vertically in the opening of a mound in a rodent run. A U-shaped pin 71 can be placed across the trap and into the dirt to hold the trap in place. The trap also can be placed horizontally in the run itself or at any angle between horizontal and vertical.

When a rodent strikes the pad 48 on the trigger rod 46, it moves away from its set position and the small balls 62 are free to move out of the sockets 64 in the cam 56. The compression of the spring 40 working through the spherical head 36 urges the large balls 42 toward the case 12 and the taper of the notch 44 in turn allows the case 12 to be moved toward the open end of the cavity 16. Since the small balls 62 are out of the sockets 64 in the cams 56, FIG. 7, the cams are free to rotate to their second position which releases the pins 54 and the slider is free to move. The large balls 42 move to the larger part of the notches 44 and release the retainer 34. This allows the hammer mechanism 20 to move to its release position where it strikes the firing pin 27 which in turn strikes and detonates the percussive device 22.

Figure 11:
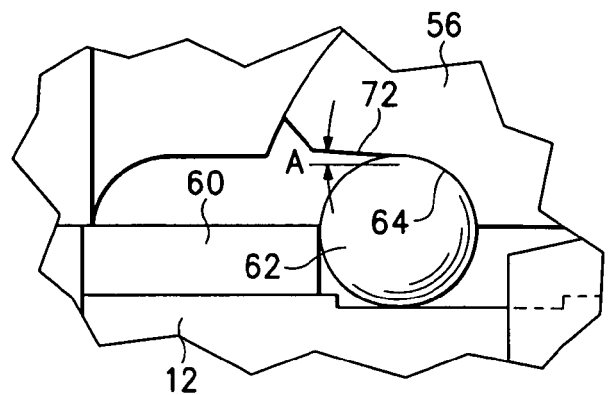

Referring to FIG. 11, the upper surfaces 72 of the sockets 64 which receive the small balls 62 are oriented at a small angle A with respect to the center line of the trap. The greater this angle the less pressure is needed to be asserted against the pad 48 of the activation rod 46 to activate the trap. Angles of approximately 1° provide a release force of 4 ounces which appears to be ideal. In addition the openings 41 that contain the large balls are flared at a 10° angle to ensure that the balls do not stick when the trap is fired, FIGS. 6 and 8.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A percussive trap comprising:
    (a) a case;
    (b) said case containing, a hammer mechanism which is movable between a cocked position and a release position where the hammer mechanism strikes a percussive device located in said trap;
    (c) an activation mechanism which releases said hammer mechanism from said cocked position;
    (d) a first safety which when engaged moves said hammer mechanism to the cocked position and simultaneously prevents said hammer mechanism from being released by said activation mechanism;
    (e) a trigger rod, projecting from within said case, which activates said activation mechanism when said trigger rod is moved along a path parallel to a longitudinal axis of the case from a set position, in which the trigger rod projects a first distance from the case, to a release position, in which the trigger rod projects a second distance from the case, the second distance being different from the first distance; and
    (f) a second safety, located nearer a first end of the case opposite the trigger rod than a second end of the case adjacent the trigger rod, a portion of the second safety is movable to block the path of the trigger rod from the set position to the release position.

2. The trap of claim 1 wherein said second safety can only be engaged when said first safety is fully engaged.

3. The trap of claim 1 wherein said hammer mechanism comprises:
    (a) a rod;
    (b) a compression spring which surrounds said rod;
    (c) a retainer attached to a first end of said rod which is configured to hold said spring on said rod; and
    (d) said retainer having a rounded head.

4. The trap of claim 3 wherein said trap further comprises:
    (a) the case comprising an annular cylindrical case;
    (b) a cylindrical slider which is slidable within said case, said slider having a cylindrical cavity defined therein, said cavity having an enclosed end with an opening extending centrally therethrough;
    (c) said hammer mechanism fits within said cavity with a second end of said rod extending through said opening; and
    (d) said opening is configured such that said enclosed end engages said spring.

5. The trap of claim 4 wherein said first safety comprises:
    (a) said rod being threaded;
    (b) a threaded knob that fits on said rod; and
    (c) said knob being configured to engage said enclosed end when said knob is rotated on said rod to draw said retainer toward said enclosed end so as to compress said spring between said retainer and said enclosed end and place said hammer in its cocked position.

6. The trap of claim 5 wherein said activation mechanism comprises:
    (a) a plurality of large balls which fit loosely in openings located circumferentially around said slider, said large balls having a dimension which is greater than a thickness of said slider;

(b) said spring having a diameter which causes said spring to engage said large balls and keep them from moving into said cavity;
(c) notches located in said case, a respective one of said notches adjacent to each of said large balls, said notches being tapered such that said notches become increasingly deeper progressing toward said enclosed end; and
(d) said notches and large balls are configured such that when said spring is not compressed and said hammer mechanism is not in its cocked position, said spring urges said balls into deepest ends of said notches and prevents said slider from moving relative to said case.

7. The trap of claim 6 wherein said large balls and said notches are configured such that when said spring is compressed and said hammer mechanism is placed in the cocked position, said balls can move further into said cavity against the rounded head of said retainer and allow said slider to move away from said enclosed end until said balls are located midway in said notches and said second safety comprises a lock mechanism which, when engaged, prevents said sleeve from moving relative to the case.

8. The trap of claim 7 wherein said trigger rod is slidable in said case between the set position and the release position and when engaged said second safety prevents said trigger rod from being moved to said release position.

9. The trap of claim 8 wherein said second safety includes a pair of pins which project from said slider and said lock mechanism is movable between a first position where said lock mechanism engages said pins and prevents the slider from moving relative to the case and a second position where it receives said pins and allows said slider to be moved relative to the case.

10. The trap of claim 9 including a pair of small balls which hold said lock mechanism in said first position when said second safety is engaged.

\* \* \* \* \*